US009810087B2

United States Patent
Corcoran et al.

(10) Patent No.: US 9,810,087 B2
(45) Date of Patent: Nov. 7, 2017

(54) REVERSIBLE BLADE ROTOR SEAL WITH PROTRUSIONS

(71) Applicant: United Technologies Corporation, Hartford, CT (US)

(72) Inventors: Christopher Corcoran, Manchester, CT (US); Daniel A. Snyder, Manchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 253 days.

(21) Appl. No.: 14/748,876

(22) Filed: Jun. 24, 2015

(65) Prior Publication Data

US 2016/0376903 A1    Dec. 29, 2016

(51) Int. Cl.
*F01D 11/00* (2006.01)
*F01D 5/08* (2006.01)
(Continued)

(52) U.S. Cl.
CPC ............ *F01D 11/006* (2013.01); *F01D 5/081* (2013.01); *F01D 5/22* (2013.01); *F01D 5/3015* (2013.01);
(Continued)

(58) Field of Classification Search
CPC .......... F01D 11/006; F01D 5/081; F01D 5/22; F01D 5/3015; F01D 11/008; F16J 15/02;
(Continued)

(56) References Cited

U.S. PATENT DOCUMENTS 4,474,532 A    10/1984 Pazder
4,536,129 A    8/1985 Jankot
(Continued)

FOREIGN PATENT DOCUMENTS

EP    0437977    7/1991
EP    1878873    1/2008
(Continued)

OTHER PUBLICATIONS

Extended European Search Report for European Application No. 16176255.4 dated Nov. 30, 2016.
U.S. Appl. No. 62/031,198, filed Jul. 31, 2014.

*Primary Examiner* — Dwayne J White
*Assistant Examiner* — Justin Pruitt
(74) *Attorney, Agent, or Firm* — Carlson, Gaskey & Olds, P.C.

(57) ABSTRACT

A sealing structure for a gas turbine engine includes a rotor that has a rim with slots and a cooling passage. The rotor is rotatable about an axis. First and second blades are arranged in the slots and respectively including first and second shelves facing one another within a pocket that is in fluid communication with the cooling passage. The first and second shelves form an opening. A reversible seal is arranged within the pocket and has a body that is configured for operative association with the first and second blades in any of four orientations to seal the opening in a second condition. The seal includes first and second protrusions respectively extending from first and second faces opposing one another. The first protrusions supported on the rim in a first condition.

20 Claims, 5 Drawing Sheets

(51) Int. Cl.
  *F01D 5/22* (2006.01)
  *F01D 5/30* (2006.01)
  *F02C 7/18* (2006.01)
  *F16J 15/02* (2006.01)

(52) U.S. Cl.
  CPC .............. *F01D 11/008* (2013.01); *F02C 7/18* (2013.01); *F16J 15/02* (2013.01); *F05D 2220/32* (2013.01); *F05D 2240/24* (2013.01); *F05D 2240/55* (2013.01); *F05D 2250/72* (2013.01); *F05D 2260/20* (2013.01); *Y02T 50/676* (2013.01)

(58) Field of Classification Search
  CPC .............. F05D 2220/32; F05D 2240/24; F05D 2250/72; F05D 2260/20; Y02T 50/676
  See application file for complete search history.

(56) References Cited

U.S. PATENT DOCUMENTS

| | | | |
|---|---|---|---|
| 4,659,285 A | 4/1987 | Kalogeros et al. | |
| 4,775,296 A | 10/1988 | Schwarzmann et al. | |
| 5,310,319 A | 5/1994 | Grant et al. | |
| 5,511,945 A | 4/1996 | Glezer et al. | |
| 5,513,955 A * | 5/1996 | Barcza | F01D 11/006 416/193 A |
| 5,888,049 A | 3/1999 | Broadhead et al. | |
| 5,975,844 A | 11/1999 | Milazar et al. | |
| 5,984,630 A | 11/1999 | Di Salle et al. | |
| 6,017,189 A * | 1/2000 | Judet | F01D 5/081 416/193 A |
| 6,431,825 B1 | 8/2002 | McLean | |
| 6,481,959 B1 | 11/2002 | Morris et al. | |
| 6,749,400 B2 | 6/2004 | Dougherty et al. | |
| 7,114,339 B2 | 10/2006 | Alvanos et al. | |
| 7,300,246 B2 | 11/2007 | Durocher et al. | |
| 7,901,186 B2 | 3/2011 | Cornett et al. | |
| 8,038,399 B1 | 10/2011 | Liang | |
| 2004/0041350 A1* | 3/2004 | Beeck | F16J 15/0887 277/503 |
| 2016/0032747 A1 | 2/2016 | Bez et al. | |

FOREIGN PATENT DOCUMENTS

| | | |
|---|---|---|
| EP | 2110515 | 10/2009 |
| EP | 2738353 | 6/2014 |
| WO | 2015038605 | 3/2015 |
| WO | 2015069362 | 5/2015 |
| WO | 2015073112 | 5/2015 |

* cited by examiner

REVERSIBLE BLADE ROTOR SEAL WITH PROTRUSIONS

STATEMENT REGARDING FEDERALLY SPONSORED RESEARCH OR DEVELOPMENT

This invention was made with government support under Contract No. FA8650-09-D-2923-0021, awarded by United States Air Force. The Government has certain rights in this invention.

BACKGROUND

This disclosure relates to seals used in turbine engines, and more particularly, to seals used with rotating parts within turbine engines.

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Rotatable stages of the gas turbine engine, such as a turbine stage, typically include a circumferential array of blades secured to a rotor by a fir-tree type attachment. These attachments need to be kept cool from hot combustion gases in the gas flow path in order to provide sufficient strength to retain the turbine blades to the rotor throughout engine operation.

Seals can be utilized to help prevent hot gases from reaching the rotor, and thereby assist in maintaining sufficient rotor strength to the retain blades. Thus, there is a continuing need in the art for improved sealing capability, ease of installation, manufacturing tolerances, and longevity for seals used with rotating parts such as rotors.

SUMMARY

In one exemplary embodiment, a sealing structure for a gas turbine engine includes a rotor that has a rim with slots and a cooling passage. The rotor is rotatable about an axis. First and second blades are arranged in the slots and respectively including first and second shelves facing one another within a pocket that is in fluid communication with the cooling passage. The first and second shelves form an opening. A reversible seal is arranged within the pocket and has a body that is configured for operative association with the first and second blades in any of four orientations to seal the opening in a second condition. The seal includes first and second protrusions respectively extending from first and second faces opposing one another. The first protrusions supported on the rim in a first condition.

In a further embodiment of the above, the second face is configured to engage the shelves in the second condition. The second condition is an engine operating condition.

In a further embodiment of any of the above, the second protrusions are located within the opening in the second condition.

In a further embodiment of any of the above, each of the shelves includes a leg that cooperates with the second protrusions to limit axial movement of the reversible seal in the first and second conditions.

In a further embodiment of any of the above, the sealing structure includes forward and aft covers respectively engaging forward and aft sides of the first and second blades to enclose the pocket. The legs are arranged adjacent to the forward side. The reversible seal is configured to be installed from the aft side with the aft cover removed.

In a further embodiment of any of the above, the first and second faces are respectively spaced from the rim and the shelves in the first condition.

In a further embodiment of any of the above, the second protrusions extend into the opening in the first condition.

In a further embodiment of any of the above, the reversible seal extends in a generally axial direction corresponding to the axis. Each of the first and second faces are provided by angled surfaces joined at an apex.

In a further embodiment of any of the above, the apex is flat and is circumferentially centered within the opening in the second condition.

In a further embodiment of any of the above, the reversible seal includes first and second opposing ends spaced apart along the axis. Each has a substantially parallelogram shape.

In a further embodiment of any of the above, the first and second opposing ends are parallel to one another. The first and second faces are rectangular in shape from an elevational view.

In a further embodiment of any of the above, each of the angled surfaces includes one protrusion that extends a length along the axis. The length is less than an axial distanced between axially spaced first and second opposing ends of the reversible seal.

In a further embodiment of any of the above, the blades are turbine blades.

In a further embodiment of any of the above, the blades each include a platform that supports an airfoil. The platforms are spaced radially outward relative to the shelves.

In another exemplary embodiment, a seal for a gas turbine engine rotatable stage. The seal includes a body that includes first and second protrusions respectively extending from first and second faces opposing one another. The body is reversible 180° about first, second and third axes that are orthogonal relative to one another such that the seal body is installable in any of four unique orientations.

In a further embodiment of any of the above, the reversible seal extends in a generally axial direction corresponding to the axis. Each of the first and second faces are provided by angled surfaces joined at an apex.

In a further embodiment of any of the above, the apex is flat and is circumferentially centered within the opening in the second condition.

In a further embodiment of any of the above, the reversible seal includes first and second opposing ends spaced apart along the axis. Each has a substantially parallelogram shape.

In a further embodiment of any of the above, the first and second opposing ends are parallel to one another, and the first and second faces are rectangular in shape from an elevational view.

In a further embodiment of any of the above, each of the angled surfaces includes one protrusion that extends a length along the axis. The length less than an axial distanced between axially spaced first and second opposing ends of the reversible seal.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
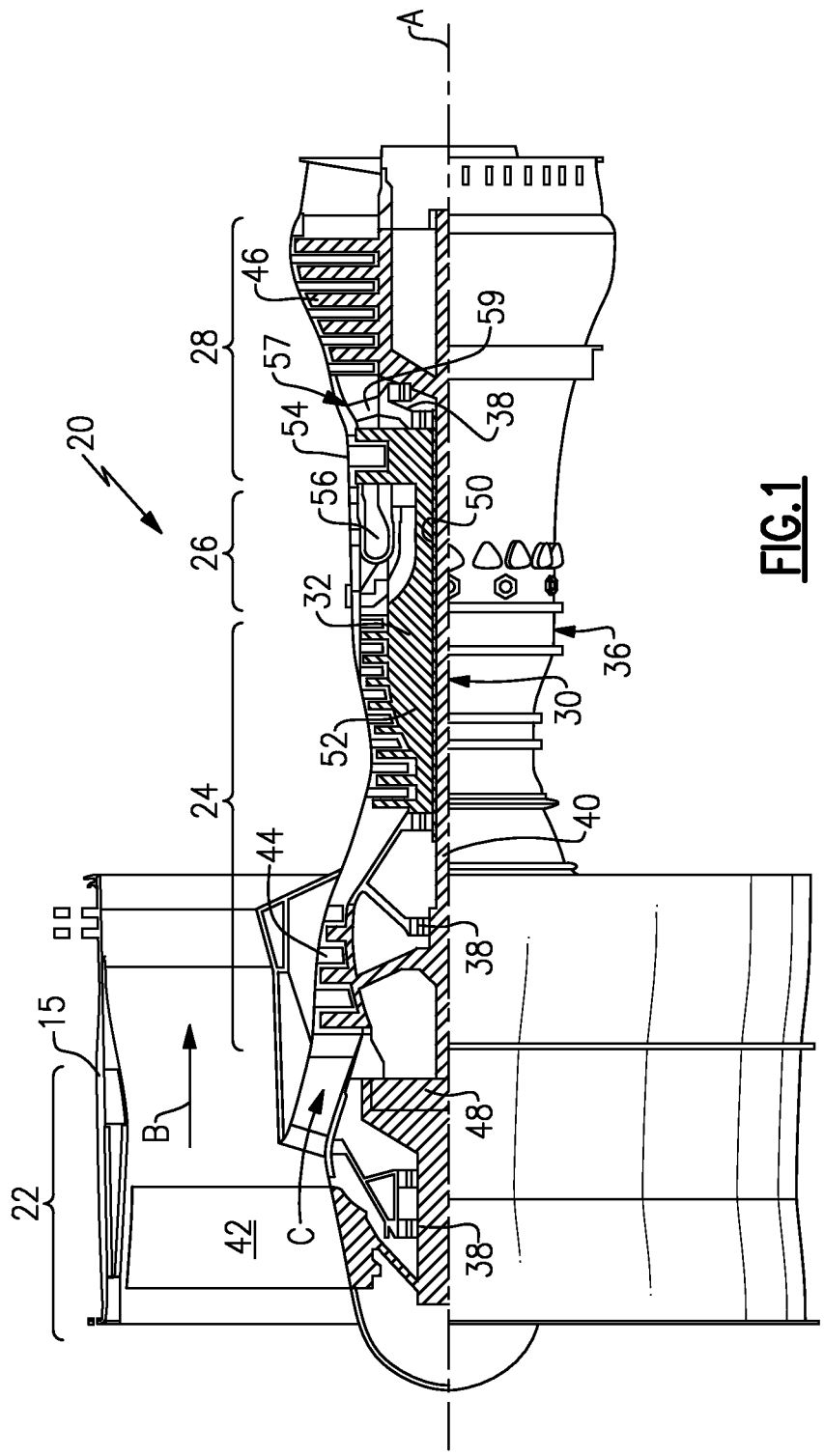
FIG. 1 schematically illustrates an exemplary gas turbine engine in accordance with various embodiments of the present disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{9.5}$. The "Low corrected fan tip speed" as disclosed herein according to one non-limiting embodiment is less than about 1150 ft/second (350.5 meters/second).

Figure 2:
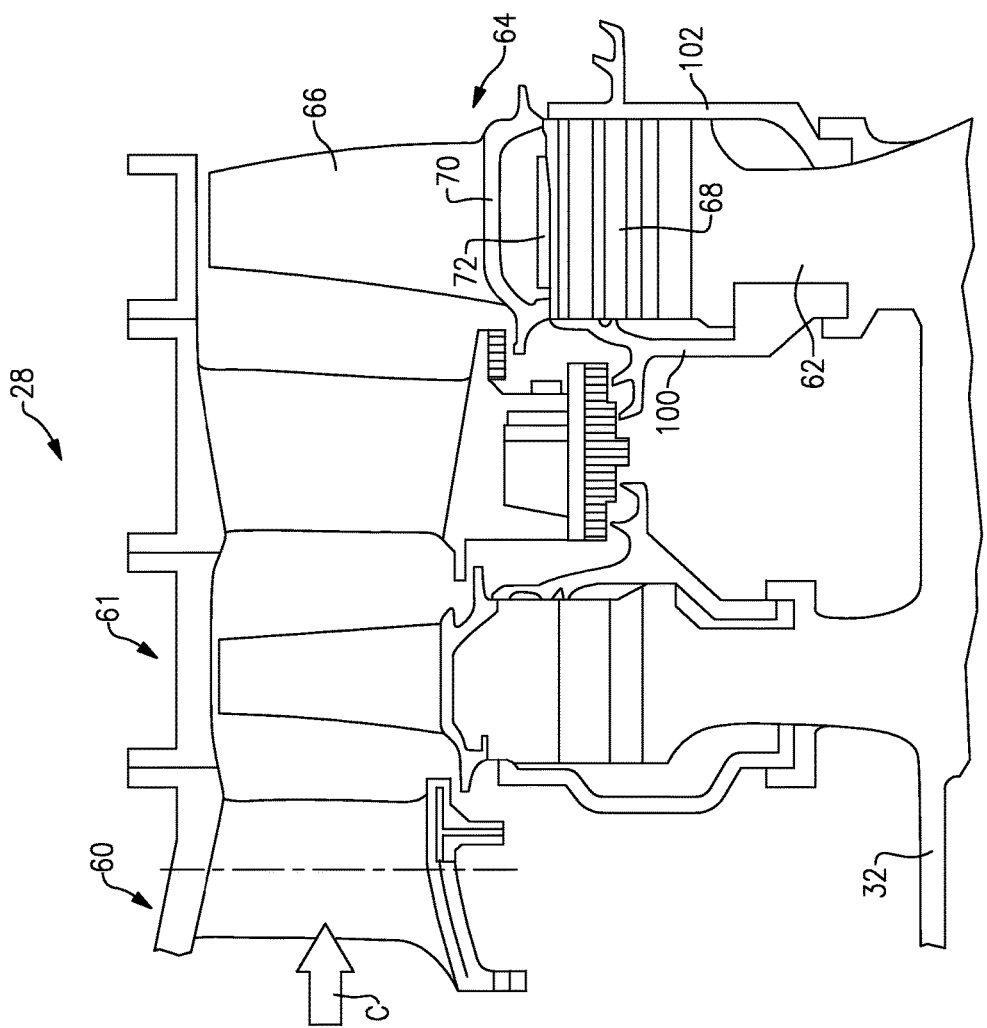
FIG. 2 is a cross-sectional view through a portion of an exemplary turbine section.
Figure 3:
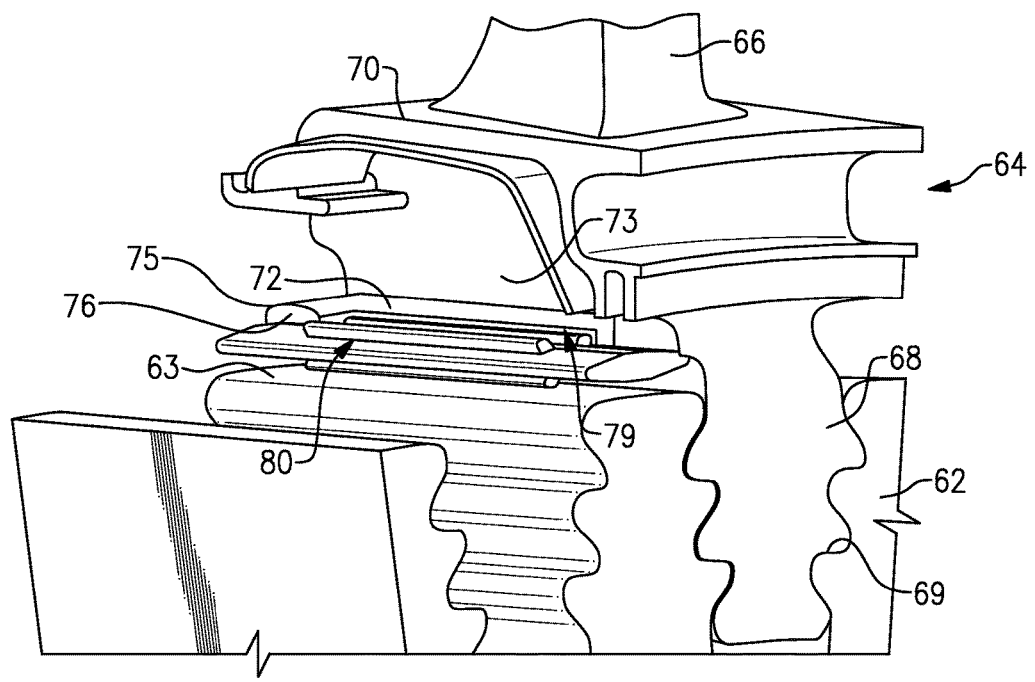
FIG. 3 is an enlarged cross-sectional view through a portion of a rotor between first and second adjacent blades.

One example turbine section 28 is shown in FIG. 2. The turbine section 28 includes a fixed stage 60 and a rotating stage 61 that includes a rotor 62 mounted to the shaft 32. A circumferential array of blades 64 is secured to the rotor 62, a portion of which is shown in FIG. 3. An airfoil 66 is supported on one side of a shelf 72 that is mounted to a root 68. Forward and aft covers 100, 102 are supported by the rotor 62 and are respectively arranged at the forward and aft sides of the blade 64 to seal a region circumferential between the blades 64.

Referring to FIG. 3, a rotor 62 has a rim 63 with slots 69 that receive the root 68 of blades 64. In the example, each blade 64 includes a platform 70 supporting the airfoil 66. The platform 70 is interconnected to the root 68 by a shank 73 supporting the circumferentially extending shelf 72. Shelves 72 of adjacent blades 64 form an opening 77. A reversible seal 80 is arranged within a pocket 74 between the blades 64 in the opening 77. Each shelf 72 includes a leg 75 arranged by a forward side of the blade 64 to limit the axial movement of the seal 80 during engine operation. The reversible seal 80 is configured to be installed from the aft side, as indicated by the arrow, with the aft cover 102 removed; however, it should be understood that the reversible seal may also be installed from the forward side or either side.

Platforms 70 of adjacent blades 64 provide a gap 76 between circumferential opposed faces of the platforms 70. It is desirable to prevent hot combustion gases from the core flow path C from entering the pocket 74. To this end, a seal 80 in accordance with the present disclosure is arranged in the pocket 74 and configured to engage the blades 64 to help seal the gap 76 by blocking hot combustion gases from travelling through the gap 76 to the rotor 62. Although seal 80 is illustrated as being used in a turbine section, it will be understood that seal 80 may additionally or alternatively be used in other sections of a turbine engine (e.g., engine 20), such as, for example, compressor section 24. Seals 80 can be arranged loosely in their respective pockets 74. Upon rotation of the rotor 62 about engine axis A, the seals 80 are forced radially outward under centrifugal loads to engage shelves 72 to obstruct the gap 76.

Figure 4:
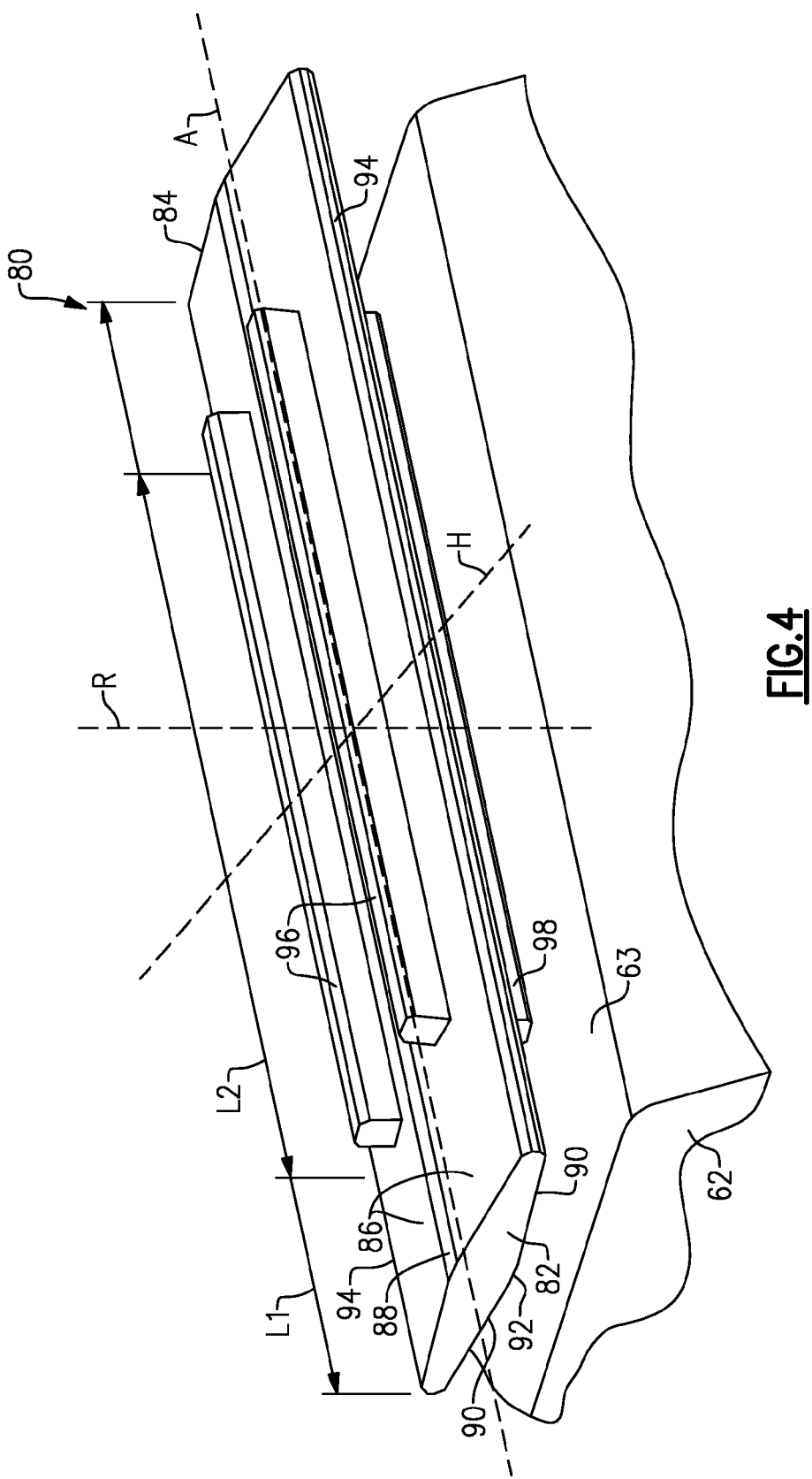
FIG. 4 is a perspective view of an example reversible blade rotor seal in accordance with various embodiments.

Referring to FIG. 4, the reversible seal 80 includes first and second faces opposite one another and respectively supporting first and second protrusions 96, 98. The reversible seal 80 is rectangular in shape when viewed elevationally and extends in an axial direction corresponding to the axis A between first and second ends 82, 84, which have a substantially parallelogram shape.

The first face is provided by first angled surfaces 86 joined by a centrally located first apex 88, which is flat in the example. Similarly, the second face is provided by second angled surfaces 90 joined by an apex 92. In the example, the apexes 88, 92 are circumferentially centered. The first and second angled surfaces 86, 90 are joined at lateral edges 94. One first protrusion 96 extends outwardly from each of the first angled surfaces 86, and one second protrusion 98 extends outwardly from each of the second angled surfaces 90. The protrusions 96, 98 extend in the axial direction a second length L1 that is less than a first length L2, which corresponds to the axial distance between the first and second ends 82, 84.

Figure 5A:
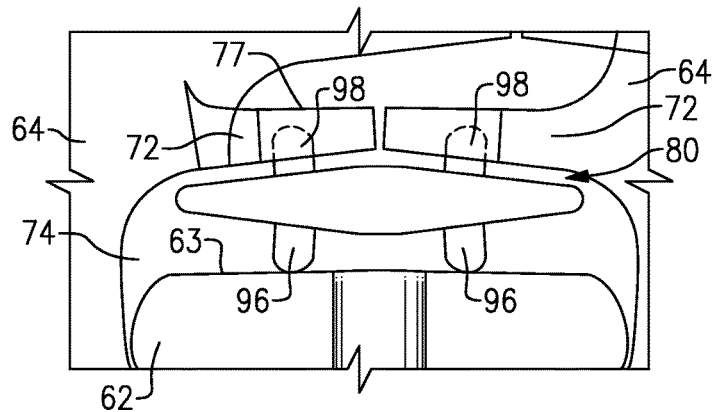
FIG. 5A is a cross-sectional view through the rotor stage with the reversible seal in a first condition.
Figure 5B:
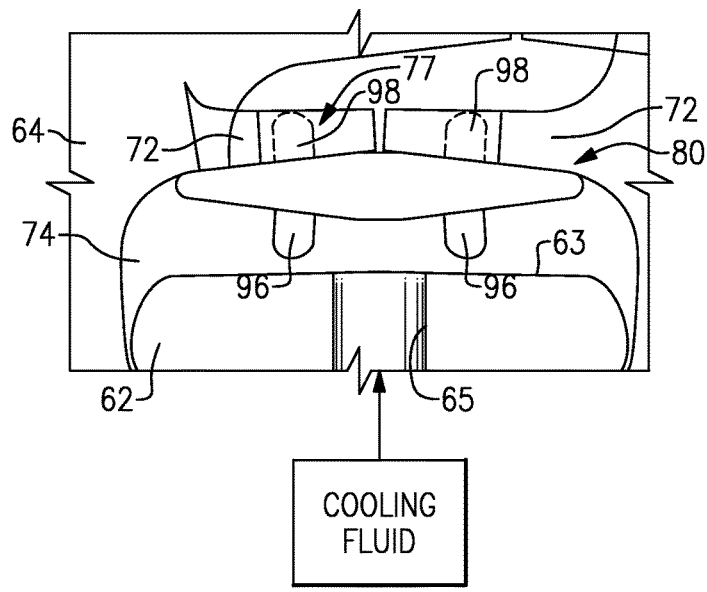
FIG. 5B is a cross-sectional view illustrated in the reversible seal in a second condition, which corresponds to an engine operating condition.
Figure 5C:
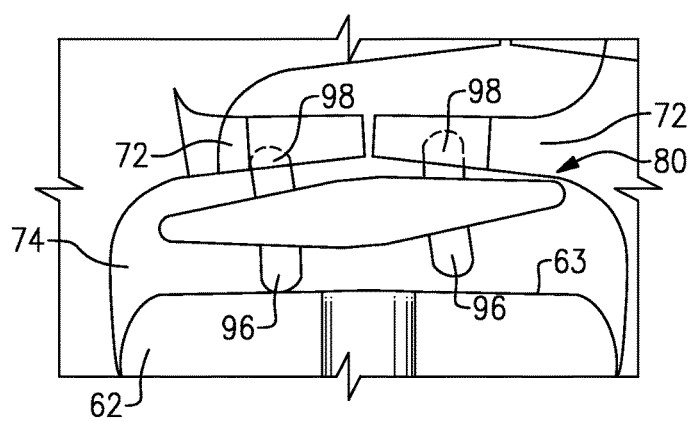
FIG. 5C is a cross-sectional view with the reversible seal in a third condition, which typically occurs between the first and second conditions.

Referring to FIGS. 5A-5C, the rim 63 has a cooling passage 65 that communicates cooling fluid from a cooling source 67 to the pocket 74 (FIG. 5B). The reversible seal may also be used in applications without cooling fluid. The reversible seal 80 is arranged within the pocket 74 and has a body that is configured for operative association with the adjacent blades 64 in any of four orientations, each presenting the same structural orientation, arrived at by rotation 180° about any of the first, second and third axes A, R, H, shown in FIG. 4, which are orthogonal relative to one another. This symmetry ensures mistake-proof installation.

The first protrusions 96 are supported on the rim 63 in a first condition shown in FIG. 5A, which corresponds to a cold or assembly condition. The first and second faces of the reversible seal 80 are respectively spaced from the rim 63 and the shelf 72 in the first condition.

The second face is configured to engage the shelf 72 in the second condition in which the second protrusions 98 are located within the opening 77. In any of the four orientations, the reversible seal 80 seals the opening 77 in a second condition, which corresponds to an engine operating condition, shown in FIG. 5B. In this position, the seal 80 blocks the leak path of the core gases in the core flowpath C through the gap 76, which is primarily at the front side of the rotor 62. Additionally, cooling air moves along between the seal 80 and the rotor 62 and escapes at the aft side, thus blocking the hot gases of the core flow C from reaching the rotor 62 at the aft side. Cooling fluid may move through the components in a manner other than described, for example, aft to front, depending on how the shelves are configured.

The third condition shown in FIG. 5C corresponds to a transition position, which may occur between the first (FIG. 5A) and second (FIG. 5B) conditions.

The seal 80 can be rigid such that it does not deform during operation of the engine 20. In one example, the seal 80 can be made of a nickel alloy, a cobalt alloy, or gamma titanium aluminide or other suitable materials.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A sealing structure for a gas turbine engine, comprising:
    a rotor that has a rim with slots and a cooling passage, the rotor rotatable about an axis;
    a first and second blades arranged in the slots and respectively including first and second shelves facing one another within a pocket that is in fluid communication with the cooling passage, the first and second shelves forming an opening; and
    a reversible seal arranged within the pocket and having a body that is configured for operative association with the first and second blades in any of four orientations to seal the opening in a second condition, the seal includes first and second protrusions respectively extending from first and second faces opposing one another, the first protrusions supported on the rim in a first condition.

2. The sealing structure according to claim 1, wherein the second face is configured to engage the shelves in the second condition, and the second condition is an engine operating condition.

3. The sealing structure according to claim 2, wherein the second protrusions are located within the opening in the second condition.

4. The sealing structure according to claim 3, wherein each of the shelves includes a leg that cooperates with the second protrusions to limit axial movement of the reversible seal in the first and second conditions.

5. The sealing structure according to claim 4, comprising forward and aft covers respectively engaging forward and aft sides of the first and second blades to enclose the pocket, the legs arranged adjacent to the forward side, and the reversible seal configured to be installed from the aft side with the aft cover removed.

6. The sealing structure according to claim 1, wherein the first and second faces are respectively spaced from the rim and the shelves in the first condition.

7. The sealing structure according to claim 6, wherein the second protrusions extend into the opening in the first condition.

8. The sealing structure according to claim 1, wherein the reversible seal extends in a generally axial direction corresponding to the axis, and each of the first and second faces are provided by angled surfaces joined at an apex.

9. The sealing structure according to claim 8, wherein the apex is flat and is circumferentially centered within the opening in the second condition.

10. The sealing structure according to claim 8, wherein the reversible seal includes first and second opposing ends spaced apart along the axis, each having a substantially parallelogram shape.

11. The sealing structure according to claim 10, wherein the first and second opposing ends are parallel to one another, and the first and second faces are rectangular in shape from an elevational view.

12. The sealing structure according to claim 8, wherein the each of the angled surfaces includes one protrusion that extends a length along the axis, the length less than an axial distanced between axially spaced first and second opposing ends of the reversible seal.

13. The sealing structure according to claim 1, wherein the blades are turbine blades.

14. The sealing structure according to claim 13, wherein the blades each include a platform that supports an airfoil, the platforms spaced radially outward relative to the shelves.

15. A seal for a gas turbine engine rotatable stage, the seal comprising:
a body includes first and second protrusions respectively extending from first and second faces opposing one another, the body is reversible 180° about first, second and third axes that are orthogonal relative to one another such that the seal body is installable in any of four unique orientations.

16. The seal according to claim 15, wherein the reversible seal extends in a generally axial direction corresponding to the axis, and each of the first and second faces are provided by angled surfaces joined at an apex.

17. The seal according to claim 16, wherein the apex is flat and is circumferentially centered within the opening in the second condition.

18. The seal according to claim 16, wherein the reversible seal includes first and second opposing ends spaced apart along the axis, each having a substantially parallelogram shape.

19. The seal according to claim 18, wherein the first and second opposing ends are parallel to one another, and the first and second faces are rectangular in shape from an elevational view.

20. The seal according to claim 16, wherein the each of the angled surfaces includes one protrusion that extends a length along the axis, the length less than an axial distanced between axially spaced first and second opposing ends of the reversible seal.

* * * * *